Figure 1:
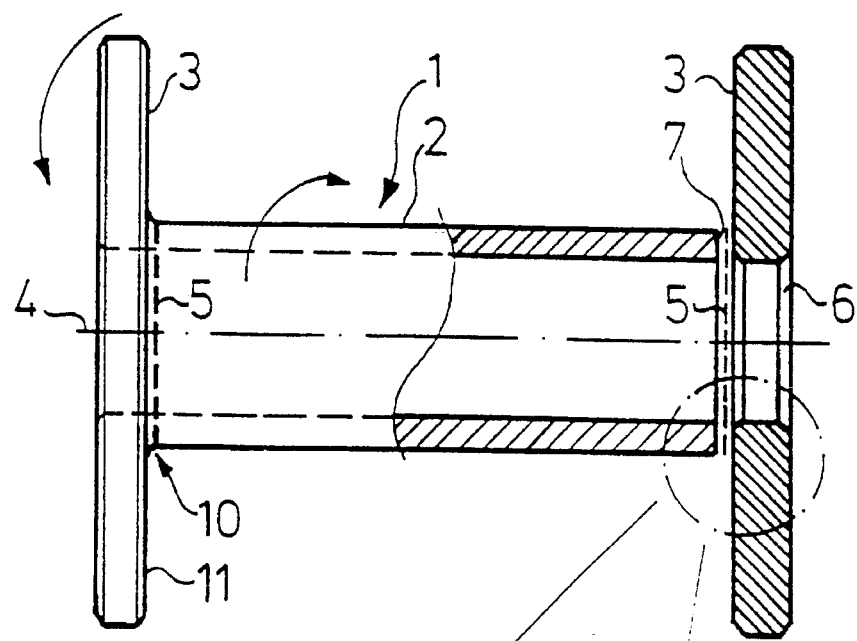

United States Patent [19]
Hildebrandt et al.

[11] Patent Number: 5,495,977
[45] Date of Patent: Mar. 5, 1996

[54] BOBBIN FOR FIBROUS WOUND MATERIAL AND METHOD FOR PRODUCING THE SAME

[75] Inventors: Dieter Hildebrandt, Bad Wörishofen; Michael Prechtel, München, both of Germany

[73] Assignee: Hildebrandt-Spulen-Bobbins GmbH, Germany

[21] Appl. No.: 349,003

[22] PCT Filed: May 18, 1992

[86] PCT No.: PCT/EP92/01088

§ 371 Date: Jan. 19, 1993

§ 102(e) Date: Jan. 19, 1993

[87] PCT Pub. No.: WO92/20603

PCT Pub. Date: Nov. 26, 1992

Related U.S. Application Data

[63] Continuation of Ser. No. 965,245, Jan. 19, 1993, abandoned.

[30] Foreign Application Priority Data

May 17, 1991 [DE] Germany .................... 41 16 139.4

[51] Int. Cl.[6] .................................................. B23K 20/12
[52] U.S. Cl. .................................... 228/112.1; 228/125
[58] Field of Search ............................ 242/118.4, 118.6, 242/118.7, 118.8; 228/112–114, 125

[56] References Cited

U.S. PATENT DOCUMENTS

| | | | |
|---|---|---|---|
| 1,589,414 | 6/1926 | Mossberg | 242/118.8 |
| 1,732,817 | 10/1929 | Mossberg | 242/118.8 |
| 1,842,143 | 1/1932 | Bowen | 242/118.4 |
| 3,144,710 | 8/1964 | Hollander et al. | 228/114.5 |
| 4,832,769 | 5/1989 | Shantz et al. | 228/114.5 X |

FOREIGN PATENT DOCUMENTS

| | | | |
|---|---|---|---|
| 1416792 | 9/1965 | France | 242/118.6 |
| 1-224185 | 7/1989 | Japan . | |

Primary Examiner—Kenneth J. Ramsey
Attorney, Agent, or Firm—Gerald E. Linden

[57] ABSTRACT

In order to produce as easily and as economically as possible a bobbin (1) for fibrous wound materials it is suggested that at least one bobbin flange (3) is a flat, annular disk and a frictional welding connection (5) is provided at at least one tube end face (7, 17) of the core tube (2) in the corner region (10) between the core tube (2) and the bobbin flange (3). The parts of the multiple-part bobbin (1) made of light metal are either turned parts or integral forge or extrusion parts (20) composed of a bobbin flange (3) and the core tube (2) which may be, if necessary, cut to the appropriate length so that no costly tool changes are required to produce special bobbin types or to modify the bobbin.

12 Claims, 2 Drawing Sheets

BOBBIN FOR FIBROUS WOUND MATERIAL AND METHOD FOR PRODUCING THE SAME

This is a continuation of commonly-owned, U.S. patent application No. 07/965,245, filed Jan. 19, 1993, now abandoned.

The invention relates to a bobbin for fibrous wound material, said bobbin having two flanges that are connected to one another by a core tube, and to a method for producing such a bobbin.

DE 39 08 223 C2 discloses a bobbin for fibrous wound material having the two symmetrically divided bobbin halves made of a light metal alloy being fixedly connected to each other by a frictional welding seam at their central core tube end faces bluntly abutted upon each other. For this purpose, the bobbin halves are produced by extruding requiring, however, relatively expensive extrusion tools. Furthermore, manufacturing the extrusion tools needs a relatively long time and causes high initial costs. In addition, the shape of the bobbin is subject to geometrical limits determined by the extrusion process. For example, producing the bobbin flanges above a predetermined diameter, e.g. >100 mm, is problematic since the wall thicknesses of the bobbin flanges are very small, as compared with the relatively large diameter.

Furthermore, storage of the bobbin halves produced as extrusion parts is relatively expensive since they may be stacked rather badly and need a lot of space. Furthermore, even slight changes in the bobbin shape, e.g. a reduced axial length, cause very complex changes at the extrusion tool such that in view of the high tool costs this process is economical essentially only for large numbers. However, for smaller numbers and a flexible production this process is rarely suitable.

The situation is similar for the bobbin of DE-OS 16 02 319 whose bobbin halves are formed as molded parts subsequently connected to each other by inert gas welding. Again, relatively high initial costs for the molds are necessary which prevents an economical production for small batches.

Furthermore, FR-A-11 30 583 discloses a bobbin made of light metal having a core tube completely inserted in two bobbin flanges followed by soldering along the exterior periphery. However, a homogenous connection cannot be achieved such that the connection seam tends to break in the corner region in view of the high axial loading of the bobbin flanges during winding-up. Furthermore, the interior diameters of the bobbin flanges and the exterior diameter of the core tube in the engaging region must be manufactured very exactly; otherwise, the result would be a weakening of the connection seam.

Furthermore, GB-A-825 540 discloses a three-part bobbin formed of metal sheet pressing parts subsequently welded together at the exterior periphery of the core tube. In this connection, it is rarely possible to achieve a uniform welding-through such that the strength is low.

Accordingly, it is the object of the invention to provide a bobbin for fibrous wound material which may be produced simply and cost-effectively even in small numbers and has a particularly high strength. There shall be provided a corresponding manufacturing method therefor.

This object is solved by the bobbin and method of manufacturing same, of the present invention.

In view of the design of the bobbin made of several parts the individual parts, in particular the flat annular bobbin flanges, may be relatively easily produced with any desired diameter, in particular by lathe processing. In the simplest case the bobbin comprises a core tube and two bobbin flanges which are produced on the lathe from corresponding raw parts, i.e. tubes, by cutting-off or separating. Therefore, changes in the geometry of the bobbin, for example a longer core tube, may be made by simply setting the lathe. Therefore, changes of tools or molds are no more necessary.

Furthermore, storing is decisively reduced since neither tools nor various starting materials need to be stored. In contrast, a plurality of differently dimensioned bobbins may be produced by means of a very small number of raw parts, e.g. extruded tubes each for the core tube and the bobbin flanges. Consequently, the initial costs are drastically reduced, as well as the delivery time for special types of bobbins.

It is of particular importance to arrange the frictional welding seam in the corner or transition region between the core tube end face and the inner side of the bobbin flange facing the core tube since by this measure a reliable welding-through of the connecting seam is achieved just in the highly loaded corner region. Furthermore, during frictional welding, the heated material is pressed and condensed thereby which results in an essentially homogenous texture, similarly as by forging or extruding, decisively increasing the strength of the bobbin.

Of particular advantage is the embodiment having a rim provided at the bobbin flanges toward the core tube end face, since in this connection the frictional zone is limited during frictional welding with the rim being then pressed and being replaced by the frictional welding seam. In this connection, only relatively low heat dissipates through the bobbin flanges such that there is a minimized loss of heat at the location of welding. On the other hand, this results in the provision of the outer frictional welding bead in the corner region between the core tube and the inner side of the bobbin flange such that there is a concentration of material which may be used for rounding during the subsequent finishing. This definitely prevents the forming of gaps in the transition region between the core tube and the bobbin flanges where wound material may be clamped.

With the manufacturing procedure of the present invention it is of particular advantage that in simplest manner specific types of bobbins may be produced having almost any desired dimensions, in particular in the case when the forged or extruded part comprising the one bobbin flange and the core tube is cut in length to the desired end length (axial length) prior to the frictional welding to the second disk-type bobbin flange.

Further advantageous modifications are subject of the subclaims.

Figure 4:
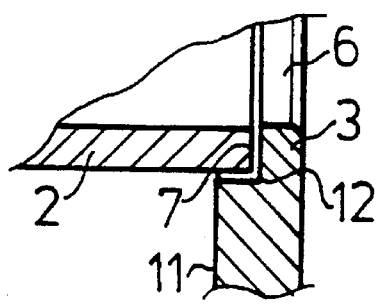
Figure 5:
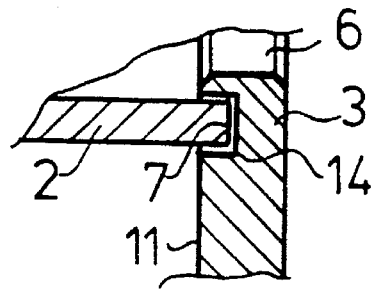
Figure 6:
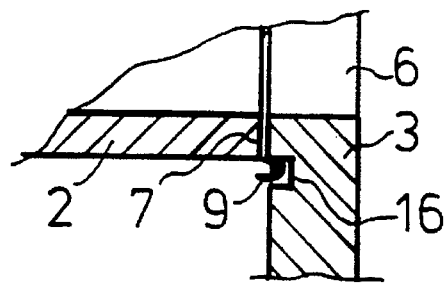
Figure 7:
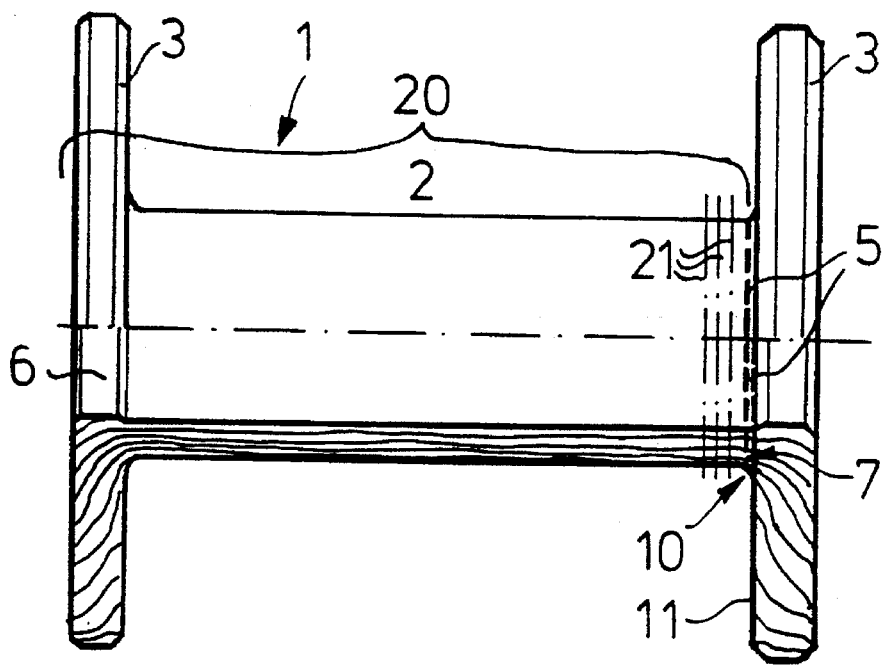

Hereinafter, the invention is described and explained on the basis of several embodiments illustrated in the drawing. There is shown in:

FIG. 1 an elevational view of the bobbin, partially in section;

FIGS. 2A and 2B, and 3A and 3B an enlarged illustration each of the corner region of the bobbin in positions joint and welded together;

FIGS. 4 to 6 an enlarged illustration each of modifications of the corner region; and FIG. 7 a schematic view of the texture or structure of a bobbin half in section.

FIG. 1 illustrates a bobbin 1 essentially comprising a core tube 2 and two end bobbin flanges 3 formed with rotational symmetry about the axis 4 of the bobbin 1. The two bobbin flanges 3 are formed as flat, annular disks having bearing seats 6 in their centers for being fixed to the winding machine or textile machine. The bobbin flanges 3 are attached to the two core tube end faces 7 by means of a frictional welding seam 5 each. During frictional welding the core tube 2 and the bobbin flange 3 are turned against each other, as illustrated by the two opposite arrows in the left half, and are pressed against each other. In the right half the bobbin 1 is illustrated in partial section with the bobbin flange 3 being shown in a position as it is positioned immediately before the frictional welding, followed by the forming of the annular frictional welding seam 5 shown in dash-dot lines. The corner or transition region from the core tube 2 to the bobbin flange 3 is illustrated in the subsequent Figures in enlarged scales. However, the frictional welding connection 5 may be accomplished as well in the manner illustrated in FIG. 1 by frictionally welding the core tube end 7 and the inner side 11 of the bobbin flange 3 in a blunt-joint manner.

Figure 2A:
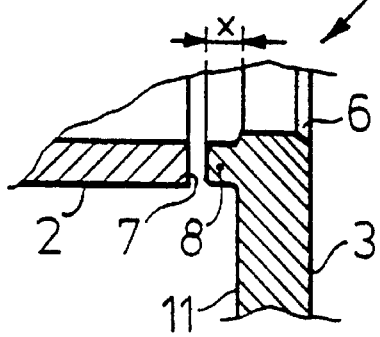

FIG. 2A illustrates the corner region 10 with enlarged scale. The bobbin flange 3 has a projecting rim 8 approximately corresponding to the wall thickness of the core tube 2 and having an axial length x which again corresponds to the wall thickness of the core tube 2. Since, in general, the wall thickness of the core tube 2 is only several millimeters, the rim 8 projects beyond the inner side 11 of the bobbin flange 3 only by several millimeters. Therefore, the axial length of the rim 8 is usually 2 to 5 mm. In contrast to the flush-type embodiment in FIG. 1 this rim 8 serves essentially for omitting introducing heat into the bobbin flange 3 during the frictional welding step, such that the loss of heat at the welding location is minimized. In addition, by this limited heat dissipation in view of the rim 8 lower pressing forces are required during frictional welding. Furthermore, the rim 8 having only a few millimeters in height results in an exact position of the frictional welding seam 5, in particular the outer formed frictional welding bead 9, in the corner region 10 between the core tube 2 and the bobbin flange 3 a material concentration being formed there in view of the hot-pressing of the material.

Figure 2B:
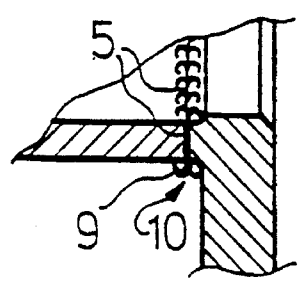

This shape after the frictional welding is illustrated in FIG. 2B. As may be seen, the corner region 10 may be rounded when turning (machining) the frictional welding seam 5.

Figure 3A:
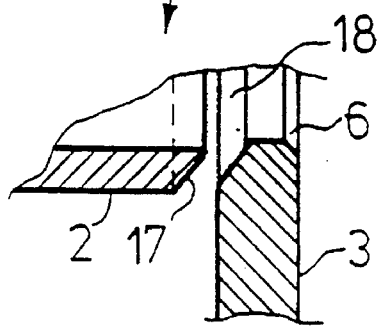
Figure 3B:
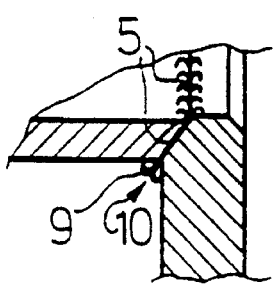

It should be noted that with bobbin flanges 3 being thicker dimensioned in the direction of axis 4, the frictional welding connection 5 may be slightly sunk within the bobbin flange 3, as illustrated in FIGS. 3A and 3B. Then, the core tube end, here designated with 17, is circularly tapered, whilst the bobbin flange 3 is provided with a correspondingly formed conical recess 18 having the same tapering. As may be gathered from FIG. 3B, during frictional welding the tapered core tube end 17 and the recess 18 engage each other and form the frictional welding seam 5 in the corner region 10.

FIGS. 4 to 6 illustrate modified embodiments of the corner region 10, with the core tube end face 7 perpendicularly being aligned to the bobbin axis 4, as in FIGS. 1 and 2. In FIG. 4 the core tube end 7 engages a step-type recess 12 in the bobbin flange 3. During frictional welding the core tube end 7 is then hot-pressed and, therefore, forms an intimate highly stable connecting seam in the region of the step 12. Similarly, with the embodiment according to FIG. 5, the core tube end 7 engages a groove 14 recessed at the inner side 11 and being welded thereto over the whole surface, since the hot-pressed material of the core tube corner completely fills the groove 14 and, in addition, forms a highly stable connection with the adjacent material of the bobbin flange 3 with the texture being aligned in the corner region 10. This is true for the embodiment of FIG. 6 as well, where an annular groove 16 is formed into the inner side 11 having a slightly larger diameter than the core tube 2.

Material hot-pressed during frictional welding penetrates into this annular groove 16, as indicated by reference numeral 9, and fills the latter and connects to the material of the bobbin flange 3 by forming the outer frictional welding bead 9 simultaneously improving the texture. The annular groove 16 limits the heat dissipation into the bobbin flange 3 during frictional welding.

For manufacturing the bobbin explained above of light metal, first the two bobbin flanges 3 and the core tube 2 are produced preferably from tube material by means of a lathe processing, in particular by cutting and, if required, forming of the rim 8. Then, these elements are frictionally welded, with a preferred procedure the two bobbin flanges 3 being simultaneously fricitonally welded in one operational step. For example, for this purpose the core tube 2 may be driven and the two bobbin flanges 3 are pressed onto the rotating core tube 2 in a simplest operation. However, the bobbin flanges 3 may be rotatably driven as well, whilst the core tube 2 is in rest or rotates in opposition, respectively After the frictional welding, in general it is only necessary to remove the frictional welding bead 9 with minimum removal quantities, in particular in the corner region. The inner frictional welding bead in the region of the bearing seats 6 may be removed simultaneously with the bearing treatment, with the further advantage that the inner frictional welding bead is better accessible and may be controlled more exactly, as compared with the central embodiment according to DE 39 08 225 C2. This enables an improved checking of the welding seam and, therefore, a better quality control. The frictionally welded bobbin 1 is preferably hardened prior to the finishing up to a higher strength. As a material, in particular AlMn-alloys are adapted.

FIG. 7 illustrates a particularly advantageous embodiment of the bobbin 1. Here, the left bobbin flange 3 is formed together with the whole core tube 2 as an integral forge or extruded element 20 whose core tube end 7 is then only frictionally welded, as explained in connection with FIG. 1, to the right bobbin flange 3. As shown, the weld bead is removed such that the weld smoothly merges with the bobin surfaces. Here, in the half-section in the lower portion of the Figure, the texture of the light metal is schematically illustrated, with the predominantly axially directed texture of the sunk, extruded, or forged individual parts being condensed in the corner region 10 by the hot-pressing of the core tube end 7 and being deflected into the radial direction enforcing this transitional region suspicious of breaking. Accordingly, the frictionally welded corner region 10 has a similarly high strength as the opposite transitional region at the left bobbin flange which is manufactured by forging or extrusion with a non-interrupted and, therefore, highly stable texture.

Furthermore, it is of importance that the forged or extruded element 20 may be adapted to the desired length of the bobbin by correspondingly cutting it off, for example, by turning-off, sawing-off, etc., as indicated by several separating lines 21. Therefore, only a few forging or extruding molds are required for manufacturing a plurality of different bobbin lengths. The subsequent suggested frictional welding with the disk-type bobbin 3 results in a simple and fast manufacture of a highly stable bobbin 1.

We claim:

1. A method for producing a bobbin assembly to be used for winding fibrous material thereon, comprising the steps of:

providing a cylindrical core tube and first disk-type bobbin flange at a one end of the core tube as an integral forge or extrusion part, said core tube having a free end opposite the one end;

frictional welding a second disk-type bobbin flange to the free end of said core tube to form a bobbin assembly, in a manner that a resulting frictional welding bead is disposed exactly in a corner formed between a face of the second flange and the free end of the core tube, thereby causing a smooth transition of metallurgical grain line orientation between the second flange and the core tube.

2. A method, according to claim 1, wherein the core tube has a wall thickness, and further comprising:

prior to frictional welding the second flange to the core tube, providing the second flange with a rim projecting from the face thereof, said rim having a thickness and having a height, each of which are approximately equal to the wall thickness of the core tube.

3. A method, according to claim 2, further comprising:

ensuring, during frictional welding, that the projecting rim is converted in the frictional welding step to become part of the frictional welding bead.

4. A method, according to claim 1, wherein:

said core tube and first flange exhibit a first rigidity; and after frictional welding said core tube and second flange, the welded second flange and core tube exhibit a second rigidity approximately equal to said first rigidity.

5. A method, according to claim 1, further comprising:

after frictional welding, lathe processing said bobbin assembly to at least partially remove said frictional welding bead in said corner.

6. A method, according to claim 1, further comprising:

after frictional welding, lathe processing said bobbin assembly to completely remove said frictional welding bead in said corner such that the weld smoothly merges with the bobin surfaces.

7. A method, according to claim 1, further comprising:

after frictional welding, heat-hardening said bobbin assembly.

8. A method, according to claim 1, further comprising:

after frictional welding, heat-hardening said bobbin assembly; and after heat-hardening said bobbin assembly, lathe processing said bobbin assembly to at least partially remove said frictional welding bead in said corner.

9. A method, according to claim 1, further comprising:

after frictional welding, heat-hardening said bobbin assembly; and after heat-hardening said bobbin assembly, lathe processing said bobbin assembly to completely remove said frictional welding bead in said corner such that the weld smoothly merges with the bobin surfaces.

10. A method, according to claim 1, further comprising:

prior to frictional welding, cutting off the free end of the core tube to predetermine a final length for said completed bobbin assembly, taking into account any conversion of material resulting from frictionally welding the free end of the core tube to the second flange.

11. Bobbin assembly kit, comprising:

a cylindrical core tube made of light metal, having a one end and an other end opposite the one end, the core tube having a wall with a thickness; and two bobbin flanges, each formed as a flat annular disk having a rim projecting from a main surface thereof, said main surface being oriented, in use, towards a respective end of the core tube, said rim having a radial thickness substantially equal to the thickness of said core tube wall, said rim having a projecting height substantially equal to the thickness of said core tube wall, said rim being converted, when said flange is frictional welded to said core tube, to a frictional welding beam disposed exactly in a corner formed between the flange and the respective end of the core tube.

12. Bobbin assembly kit, according to claim 11, wherein:

the projecting height of the rim, prior to frictional welding, is about 2 to 5 mm.

* * * * *